(12) United States Patent
Insanic et al.

(10) Patent No.: US 9,973,014 B2
(45) Date of Patent: May 15, 2018

(54) AUTOMATED ELECTRICAL CHARGER FOR AUTONOMOUS PLATFORMS

(71) Applicant: RAYTHEON BBN TECHNOLOGIES CORP., Cambridge, MA (US)

(72) Inventors: Edin Insanic, Belmont, MA (US); Joshua Cochin, Cambridge, MA (US); Kyle Francis Usbeck, Cambridge, MA (US); Jeffrey Anthony Mazurek, Concord, MA (US)

(73) Assignee: RAYTHEON BBN TECHNOLOGIES, INC., Cambridge, MA (US)

( * ) Notice: Subject to any disclaimer, the term of this patent is extended or adjusted under 35 U.S.C. 154(b) by 40 days.

(21) Appl. No.: 15/281,018

(22) Filed: Sep. 29, 2016

(65) Prior Publication Data

US 2017/0244263 A1 Aug. 24, 2017

Related U.S. Application Data

(60) Provisional application No. 62/299,464, filed on Feb. 24, 2016.

(51) Int. Cl.
*H02J 7/00* (2006.01)
*H02J 7/02* (2016.01)
*H02J 50/10* (2016.01)

(52) U.S. Cl.
CPC ............ *H02J 7/0044* (2013.01); *H02J 7/025* (2013.01); *H02J 50/10* (2016.02)

(58) Field of Classification Search
USPC .......................... 320/107, 108, 109, 116, 162
See application file for complete search history.

(56) References Cited

U.S. PATENT DOCUMENTS

| 4,212,053 | A | 7/1980 | Sichenzia |
| 6,547,351 | B1 | 4/2003 | Wilson |
| 8,981,713 | B2 | 3/2015 | Lee et al. |
| 2004/0210289 | A1* | 10/2004 | Wang ............... A61K 9/5094 607/116 |
| 2008/0026354 | A1 | 1/2008 | Marmaropoulos et al. |
| 2009/0218884 | A1 | 9/2009 | Soar |

(Continued)

FOREIGN PATENT DOCUMENTS

| WO | WO 2012/086973 A2 | 6/2012 |
| WO | WO 2013/018084 A1 | 2/2013 |

OTHER PUBLICATIONS

Burkhart, Justin M. et al., "Design Methodology for a Very High Frequency Resonant Boost Converter", IEEE Transactions on Power Electronics, vol. 28; No. 4; Apr. 2013; pp. 1929-1937.

(Continued)

*Primary Examiner* — Brian Ngo
(74) *Attorney, Agent, or Firm* — Lewis Roca Rothgerber Christie LLP (57) ABSTRACT

A system for charging rechargeable devices. A landing surface includes a plurality of conductive patches, and a rechargeable device includes a plurality of contacts. The configurations of the conductive patches and of the contacts are selected to establish, when the contacts of the rechargeable device come into contact with the landing surface, a plurality of separate conductive paths between a charger and the rechargeable device.

20 Claims, 10 Drawing Sheets

(56) References Cited

U.S. PATENT DOCUMENTS

| | | |
|---|---|---|
| 2009/0267588 A1 | 10/2009 | Schmitz et al. |
| 2010/0100997 A1 | 4/2010 | Lee et al. |
| 2011/0235800 A1 | 9/2011 | Furukawa et al. |
| 2012/0313742 A1* | 12/2012 | Kurs ..................... B60L 11/182 336/180 |
| 2013/0005251 A1 | 1/2013 | Soar |
| 2013/0033118 A1 | 2/2013 | Karalis et al. |
| 2013/0093401 A1* | 4/2013 | Botts ........................ H02J 7/14 322/48 |
| 2015/0130405 A1 | 5/2015 | Insanic et al. |
| 2015/0270719 A1* | 9/2015 | Kurs ....................... H02J 5/005 320/108 |

OTHER PUBLICATIONS

Elliot, P.G. et al., "E-textile Microstrip Patch Antennas for GPS", IEEE, 2012, pp. 66-73.

Elmore, Glenn, "Introduction to the Propagating Wave on a Single Conductor", Corridor Systems Inc., Jul. 27, 2009, 30 pages.

Goubau, Georg, "Surface Waves and Their Application to Transmission Lines", Journal of Applied Physics, vol. 21, Nov. 1950, pp. 1119-1128.

Haga, Nozomi et al., "Equivalent Circuit of Intrabody Communication Channels Inducing Conduction Currents Inside the Human Body", IEEE Transactions on Antennas and Propagation, vol. 61; No. 5; May 2013; pp. 2807-2816.

Zimmerman, T.G., "Personal Area Networks: Near-Field intrabody communication", IBM Systems Journal, vol. 35, Nos. 3&4, 1996, pp. 609-617.

\* cited by examiner

AUTOMATED ELECTRICAL CHARGER FOR AUTONOMOUS PLATFORMS

CROSS-REFERENCE TO RELATED APPLICATION(S)

The present application claims priority to and the benefit of U.S. Provisional Application No. 62/299,464, filed Feb. 24, 2016, entitled "AUTOMATED ELECTRICAL CHARGER FOR AUTONOMOUS PLATFORMS", the entire content of which is incorporated herein by reference.

This application is related to and incorporates by reference in its entirety, as if set forth in full, U.S. patent application Ser. No. 14/535,728, entitled "SYSTEM AND METHOD FOR ELECTRICAL CHARGE TRANSFER ACROSS A CONDUCTIVE MEDIUM", filed on Nov. 7, 2014.

BACKGROUND

1. Field

One or more aspects of embodiments according to the present invention relate to charging systems, and more particularly to a system for charging that does not require precise alignment between a device being charged and contacts through which the charge is supplied.

2. Description of Related Art

Rechargeable devices, such as rechargeable unmanned aerial vehicles, may be periodically recharged, to replenish the store of energy in rechargeable batteries included in such devices. Related art methods of recharging, which may involve manually inserting a connector from a power source into a corresponding connector on the rechargeable device, may be cumbersome, especially in the case of unmanned devices, for which it may be advantageous to be capable of recharging in a remote location without any human participation.

Thus, there is a need for an improved system for charging rechargeable devices.

SUMMARY

Aspects of embodiments of the present disclosure are directed toward a system for charging rechargeable devices. A landing surface includes a plurality of conductive patches, and a rechargeable device includes a plurality of contacts. The configurations of the conductive patches and of the contacts are selected to establish, when the contacts of the rechargeable device come into contact with the landing surface, a plurality of separate conductive paths between a charger and the rechargeable device.

According to an embodiment of the present invention there is provided a system for charging, including: a rechargeable device having a plurality of electrical contacts, any two contacts of the plurality of contacts being separated by a contact separation distance of a plurality of contact separation distances; and a landing surface including m conductive patches, m being an integer greater than 1, the conductive patches being separated by a plurality of substantially straight gaps extending radially outward from a point on the landing surface, one of the conductive patches extending radially outward at least to an inner radius and at most to an outer radius, a conductive patch of the m conductive patches having: a first edge bounding a first gap of the plurality of substantially straight gaps; a second edge bounding a second gap of the plurality of substantially straight gaps, a third edge consisting of the remainder of the perimeter of the conductive patch, the length of the third edge being greater than the inner radius times 4/m.

In one embodiment, the landing surface is flat and circular, and the point is at the center of the circle.

In one embodiment, the m conductive patches include four conductive patches separated by four gaps of the plurality of substantially straight gaps, each of the four gaps forming an angle of 90 degrees with each of two other gaps of the four gaps.

In one embodiment, the m conductive patches include four conductive patches separated by four gaps of the plurality of substantially straight gaps, each of the four gaps forming an angle of more than 100 degrees or less than 80 degrees with each of two other gaps of the four gaps.

In one embodiment, the rechargeable device includes four contacts arranged in a square, each of the contacts being at one of the corners of the square.

In one embodiment, the landing surface is flat and square, and the point is at the center of the square.

In one embodiment, the system includes a plurality of legs, each terminating in a respective foot of a plurality of feet configured to support the unmanned aerial vehicle when not in flight, and wherein each of the plurality of contacts is secured to a respective foot of the plurality of feet.

In one embodiment, the plurality of legs includes four feet, and wherein the rechargeable device has sufficient compliance that when the rechargeable device rests on the landing surface the weight borne by each foot of the plurality of feet is within 20% of the weight borne by any other foot of the plurality of feet.

In one embodiment, the system includes a first skid and a second skid, the first skid and the second skid being configured to support the unmanned aerial vehicle when not in flight, and wherein: a first contact of the plurality of contacts is on a lower surface of the first skid, and a second contact of the plurality of contacts is on a lower surface of the second skid.

In one embodiment, the first contact is an elongated strip with a length of at least one half a length of the first skid, and the second contact is an elongated strip with a length of at least one half a length of the second skid.

In one embodiment, the first skid is configured to contact the landing surface over a first region at a first end of the first skid and over a second region at a second end of the first skid, and to not contact the landing surface over a third region between the first region and the second region, the second skid is configured to contact the landing surface over a fourth region at a first end of the second skid and over a fifth region at a second end of the second skid, and to not contact the landing surface over a sixth region between the fourth region and the fifth region, the first contact is in the first region, the second contact is in the fourth region, and the rechargeable device further includes: a third contact is in the second region, and a fourth contact is in the fifth region.

In one embodiment, the landing surface has only two conductive patches.

In one embodiment, the two conductive patches are separated by two gaps of the plurality of substantially straight gaps, an angle between the two gaps being greater than 160 degrees.

In one embodiment, each of the contacts has a contact diameter, and wherein each of the plurality of substantially straight gaps is wider than a largest one of the contact diameters.

In one embodiment, the rechargeable device includes five contacts and the landing surface includes five conductive patches.

In one embodiment, for any position of the rechargeable device with all five contacts in contact with the landing surface, at least two contacts of the five contacts are in contact with different respective conductive patches of the m conductive patches.

In one embodiment, for any position of the rechargeable device with all five contacts in contact with the landing surface no contact of the plurality of contacts forms a direct connection between a first conductive patch of the m conductive patches and a second conductive patch of the m conductive patches.

In one embodiment, the rechargeable device is a wheeled vehicle, the plurality of contacts includes two contacts on top of the wheeled vehicle, and the landing surface is configured to contact the plurality of contacts from above.

In one embodiment, the rechargeable device is a handheld device and the landing surface is a surface of a glove.

In one embodiment, the rechargeable device is a mobile phone and the landing surface is an interior surface of a pocket or of a holster.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of an automated electrical charger for autonomous platforms provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
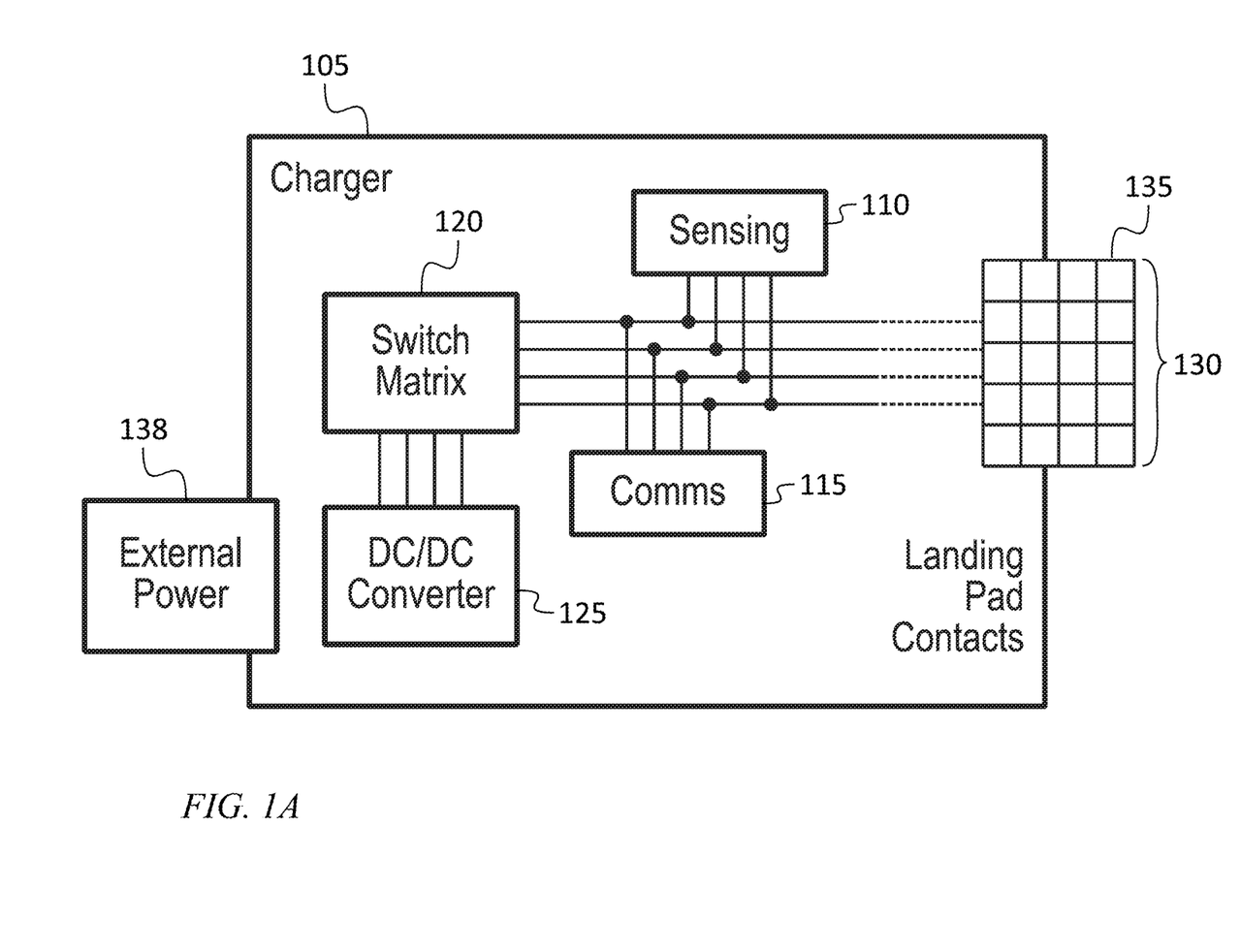
FIG. 1A is a block diagram of a charger, according to an embodiment of the present invention.
Figure 1B:
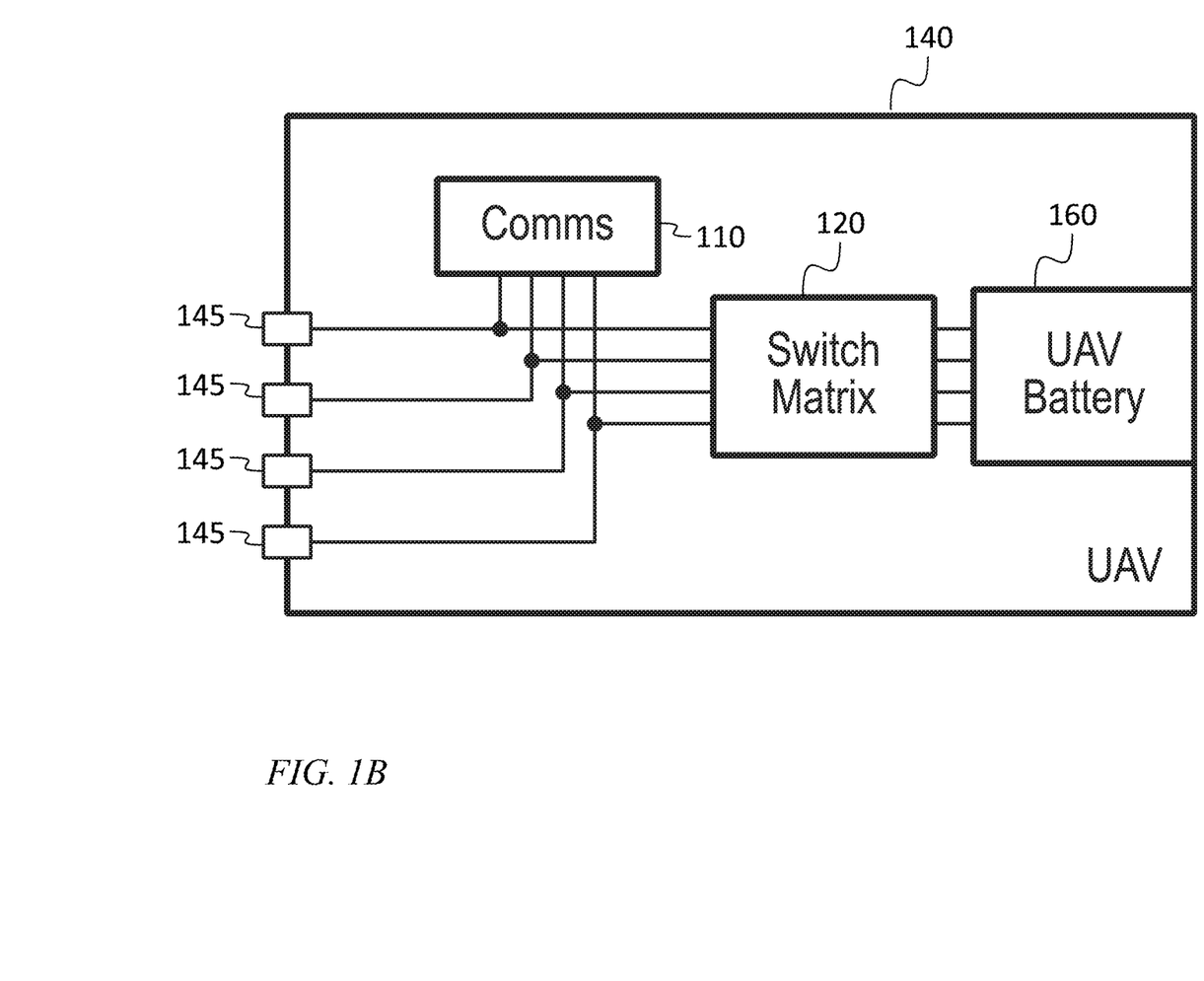
FIG. 1B is a block diagram of a rechargeable device, according to an embodiment of the present invention.

Referring to FIGS. 1A and 1B, in one embodiment a charger 105 includes a sensing circuit 110, a communications circuit 115, a switch matrix 120, a DC-to-DC converter 125, and a landing surface 130 including a plurality of conductive areas or "conductive patches" 135. The charger 105 receives external power from an external power source 138. A rechargeable device 140, such as a rechargeable unmanned aerial vehicle (UAV) includes a plurality of contacts 145, e.g., each contact 145 being on the end of a respective foot of the rechargeable unmanned aerial vehicle, the contacts 145 being configured to make contact with the conductive patches 135 of the landing surface 130. The rechargeable unmanned aerial vehicle further includes a communications circuit 150, a switch matrix 155, and a battery 160.

In operation, the rechargeable device 140 may land on or settle against the landing surface, with two or more of the contacts 145 coming into electrical contact with respective conductive patches 135. The sensing circuit 110 detects a change in the impedance between one or more pairs of conductive patches 135, and attempts to initiate communications between the communications circuit 115 of the charger 105 and the communications circuit 150 of the rechargeable device 140. Once communications are established, the charger 105 and the rechargeable device 140 negotiate which of the conductive patches 135 are to be used for charging, and they may also negotiate what the polarity of the DC power supplied to the selected conductive patches 135 will be, and optionally what a charging profile will be, e.g., what current and/or what voltage will be supplied through the conductive patches 135, and how the charging conditions may change as the charging operation progresses. The switch matrix 120 of the charger 105 may then be set according to the negotiated selection of conductive patches 135 and polarity, and the DC-to-DC converter 125 may be controlled by the charger 105 according to the negotiated charging conditions. The rechargeable device 140 may connect the battery 160 to the contacts 145 according to which of the contacts 145 is in contact with which of the conductive patches 135, and according to the negotiated selection of conductive patches 135 and polarity. Once these connections have been made, charging may proceed.

Figure 2:
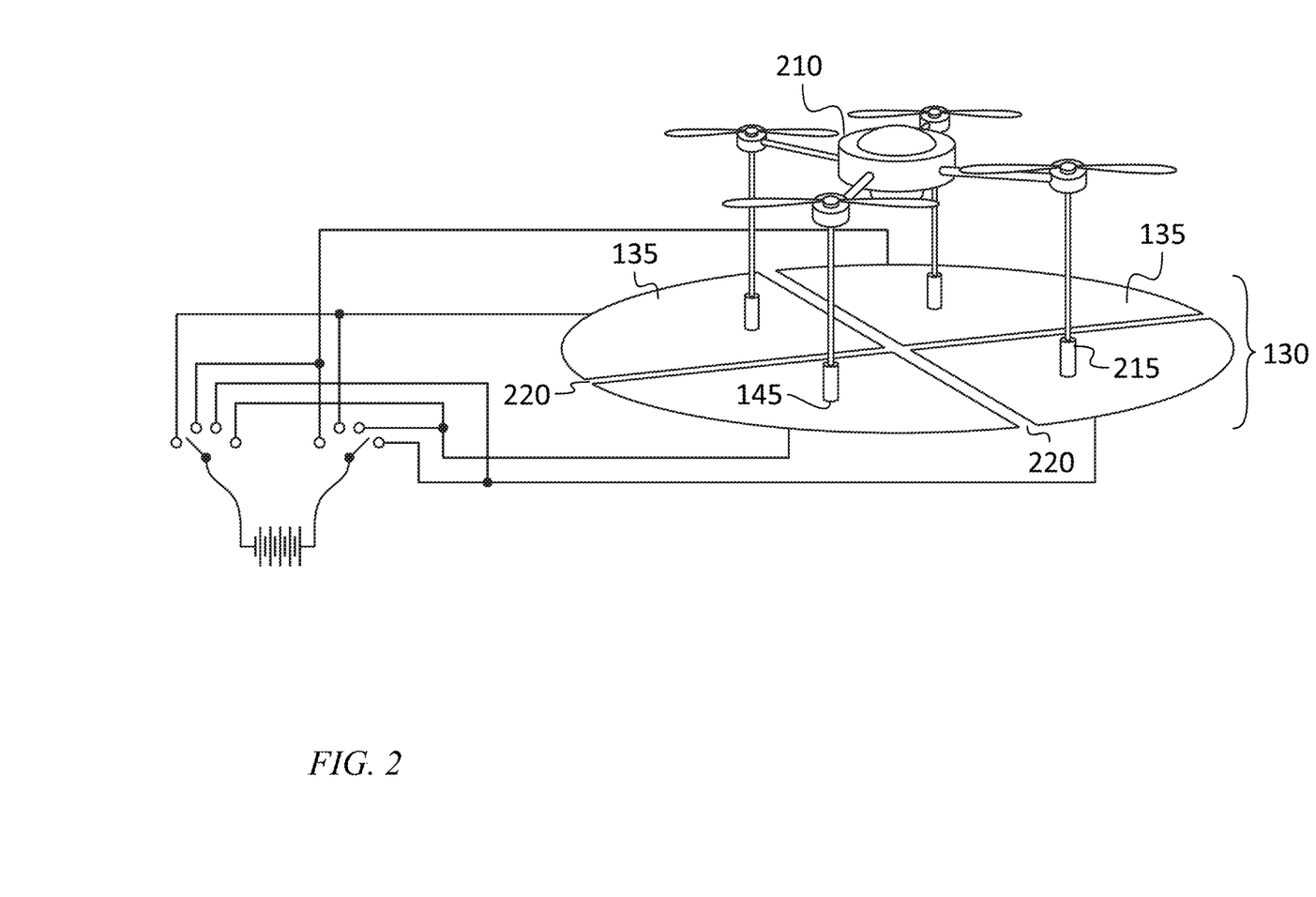
FIG. 2 is a hybrid schematic diagram and perspective view of a rechargeable unmanned aerial vehicle being recharged using a charger, according to an embodiment of the present invention.

Referring to FIG. 2, in one embodiment a rechargeable unmanned aerial vehicle 210 may have one contact 145 at each of a plurality of feet 215 (e.g., at each of four feet, as illustrated in FIG. 2, each foot being the termination of a respective leg of the rechargeable unmanned aerial vehicle). The landing surface 130 may be a flat or "planar" circular surface as shown, and the conductive patches 135 may be a approximately a 90 degree sector of the circular surface (i.e., one quarter of the circular surface) as shown, each conductive patch 135 being slightly smaller than the corresponding 90 degree sector, leaving a small gap 220 between each pair of adjacent conductive patches 135, so that the conductive patches 135 are insulated from each other by the gaps 220.

When the rechargeable unmanned aerial vehicle lands on the landing surface, its weight may be borne in substantially equal amounts by the four feet (e.g., each foot may carry one quarter +/−20% of the weight, or between 0.20 and 0.30 of the weight) of the rechargeable unmanned aerial vehicle. This substantially equal weight distribution to the feet of the rechargeable unmanned aerial vehicle may be the result of the rechargeable unmanned aerial vehicle being sufficiently compliant (e.g., having flexible legs or legs including flexible or elastic components) to absorb any unevenness in the landing surface 130 and/or deviations, in the unloaded positions of the feet, from a plane.

The rechargeable unmanned aerial vehicle may alight on the landing surface 130 as shown in FIG. 2, with one foot resting on (and a respective contact 145 making contact with) each of the four conductive patches 135. This condition may be satisfied even in the presence of some imprecision in the landing point of the rechargeable unmanned aerial vehicle. For example, in the configuration of FIG. 2, if the heading of the rechargeable unmanned aerial vehicle is accurately controlled during landing, if the feet of the rechargeable unmanned aerial vehicle fall on the corners of a square having a side length that is half of the diameter of the landing surface 130, and if the gaps 220 between the conductive patches 135 are sufficiently narrow to be neglected, then the rechargeable unmanned aerial vehicle may land with an offset from the center of the landing surface 130 that is nearly one half the radius of the landing surface 130 before two of the feet fall into a gap 220 between adjacent conductive patches 135. This amount of landing error would result in the other two feet falling off of the landing surface 130. Thus, in this situation, if the landing accuracy of the rechargeable unmanned aerial vehicle is sufficient to insure that it lands with all four feet on the landing surface, it is sufficient to insure that four separate conductive paths will be established between the charger 105 and the rechargeable unmanned aerial vehicle.

Further, if the rechargeable unmanned aerial vehicle is not sufficiently flexible (in light of the flatness of the landing surface 130 and the unloaded positions of the feet) to insure that after landing each foot will bear a significant fraction of the weight of the rechargeable unmanned aerial vehicle, it may nonetheless be the case that, after landing, at least two of the feet will each bear a significant fraction of the weight of the rechargeable unmanned aerial vehicle. The above circumstances may then nonetheless insure that at least two separate conductive paths will be established between the charger 105 and the rechargeable unmanned aerial vehicle; these two paths may then be used to charge the battery 160.

In some embodiments the rechargeable unmanned aerial vehicle may have poor control of heading while landing, or information regarding the orientation of the gaps 220 may not be available. In such a situation, if the rechargeable unmanned aerial vehicle is rotated by 45 degrees from perfect alignment (i.e., if the sides of the square the corners of which are the positions of the feet are rotated by 45 degrees with respect to the gaps 220), then if the rechargeable unmanned aerial vehicle is centered on the landing surface 130 (i.e., if the square is centered on the point at which the gaps 220 meet), each of the feet may fall on a respective gap 220. This may result in the contacts 145 bridging all four of the gaps 220, connecting all four of the conductive patches 135 together to form one conductor, or, if the contacts 145 are smaller than the gaps, it may result in none of the contacts 145 making electrical contact with any of the conductive patches 135. In either case, there may not be two separate conductive paths established between the charger 105 and the rechargeable unmanned aerial vehicle, for charging the battery 160.

Each contact may be substantially circular, in which case the size of each contact may be defined by the diameter of the circle. For contacts that are not circular, a useful measure of the size of each contact may be the smallest circle within which the contact will fit. As used herein, the "contact diameter" of a contact is the diameter of the smallest circle within which the contact will fit.

In one embodiment this situation may be avoided by changing some combination of (i) the angles between the gaps 220, (ii) the positions of the feet, (iii) the number of feet, and (iv) the number of conductive patches 135. For example, in an embodiment with five feet equally spaced (e.g., spaced 72 degrees apart) on a circle of a first diameter, and a circular landing surface 130 having a second diameter including five conductive patches 135, each approximately in the shape of a sector of the landing surface (each conductive patch 135 being slightly smaller than such a sector to provide for a small gap 220 between adjacent conductive patches 135), the first and second diameter, the width of the gaps, the width of the contacts 145, and the angles of the sectors may be chosen (e.g., the angles of the sectors may be chosen to differ from each other) such that every position of the rechargeable unmanned aerial vehicle on the landing surface 130 results in at least two separate conductive paths between the charger 105 and the rechargeable unmanned aerial vehicle.

In some embodiments a rechargeable unmanned aerial vehicle may have landing gear consisting of skis, or "skids" that may form, for example, two elongated surfaces over which the rechargeable unmanned aerial vehicle makes contact with the landing surface 130. The bottom surface of each skid may include a single elongated contact 145 extending the entire length of the skid (resulting, for example, in a pair of contacts 145 shaped like those illustrated in FIGS. 6A and 6B). In other embodiments, the bottom surface of each skid may include a plurality of contacts 145, each representing a possible separate conductive path between the charger 105 and the rechargeable unmanned aerial vehicle. In some embodiments the plurality of contacts 145 on the bottoms of the skids forms a similar configuration (e.g., 4 circular contacts 145 falling on the corners of a square) as that of the embodiment of FIG. 2. In some embodiments each skid cambers, i.e., is arched upward over a central portion of the skid, so that it makes contact with the landing surface 130 only at two points near the two ends of the skid; two contacts 145 may then be positioned on the bottom surface of each skid at the two points respectively at which it makes contact with the landing surface.

In some embodiments the conductive patches 135 together form a region that (except for the gaps 220) is defined by a shape other than a circle, e.g., an ellipse, a square or other regular polygon, an irregular polygon, or another convex or non-convex shape. In general, such a shape may, as in the case of sectors of a circle, be divided into a plurality of conductive patches 135 by a plurality of gaps 220 extending radially outward from a point, or "hub point" on the landing surface 130. Each gap may be substantially straight. As used herein, a "substantially straight gap" refers to one for which a radial line can be drawn from the hub point to the edge of the landing surface 130, the line being entirely within the gap. As such, the edges of a "substantially straight gap" need not be perfectly straight.

Each of the conductive patches 135 may have a boundary including two edges defined by two respective gaps 220 and a third edge defining the outer boundary of the conductive patch 135. The third edge may include a point nearest the hub point, separated from the hub point by an "inner radius" of the conductive patch 135 and a point farthest from the hub point, separated from the hub point by an "outer radius" of the conductive patch 135, so that the third edge is entirely within a region between a first circle, centered on the hub point, having a radius equal to the inner radius and a second circle, centered on the hub point, having a radius equal to the outer radius. For a set of conductive patches 135 bounded by a square, for example, the ratio of the inner radius to the outer radius may be approximately 0.707. In some embodiments this ratio is greater than 0.2 or greater than 0.6.

In some embodiments, at least one of the conductive patches has a third edge that has a length greater than the inner radius times 4/m, where m is the number of conductive patches. For example, for a configuration with 4 conductive patches, such as that of FIG. 2, the third edge of one of the conductive patches may have a length greater than its inner radius (i.e., greater than 4/m times the inner radius, with m=4). In some embodiments at least one of the conductive patches has a third edge that has a length greater than the outer radius times 4/m, where m is the number of conductive patches.

For a rechargeable unmanned aerial vehicle having contacts 145 falling on a circle of a first radius, the relationship between the first radius, the minimum inner radius (i.e., the minimum over all of the conductive patches 135), and the maximum outer radius may provide an indication of the likelihood that an arbitrary or random position of the rechargeable unmanned aerial vehicle on the landing surface 130 will result in at least two separate conductive paths between the charger 105 and the rechargeable unmanned aerial vehicle. For example, if the maximum outer radius is at most slightly greater (e.g., at most 5% greater) than the minimum inner radius (as may be the case for a circular landing surface 130), and if the feet of the rechargeable unmanned aerial vehicle fall on a circle having a radius only slightly smaller (e.g., at most 5% smaller) than the minimum inner radius, then to land on the landing surface 130, the rechargeable unmanned aerial vehicle may be fairly tightly constrained in position, and it may be the case that a rechargeable unmanned aerial vehicle with three equally spaced feet (e.g., feet that fall on the corners of an equilateral triangle) may be assured of establishing two separate conductive paths between the charger 105 and the rechargeable unmanned aerial vehicle if the conductive patches 135 are two semi-circular patches together filling the landing surface 130 except for a gap extending diametrically across the center (or, equivalently, two straight gaps each extending radially outward from the center, separated by an angle of 180 degrees), and having a width greater than the contact diameter of any of the contacts 145 (so that a contact can not short the two conductive patches 135 together).

For a rechargeable unmanned aerial vehicle having an arrangement of contacts 145 that may not fall on a circle, a maximum distance between any pair of contacts may provide a useful substitute (for the first radius) as a measure of the size of the configuration of contacts. In some embodiments, the formation of two separate conductive paths between the charger 105 and the rechargeable unmanned aerial vehicle is insured, or its likelihood is increased, by selecting a configuration of conductive patches 135 in which each inner radius is at least 0.7 of the corresponding outer radius, and in which the contact configuration is one that has a maximum distance between any pair of contacts that is at least half of the outer radius of one of the conductive patches 135.

Figure 3A:
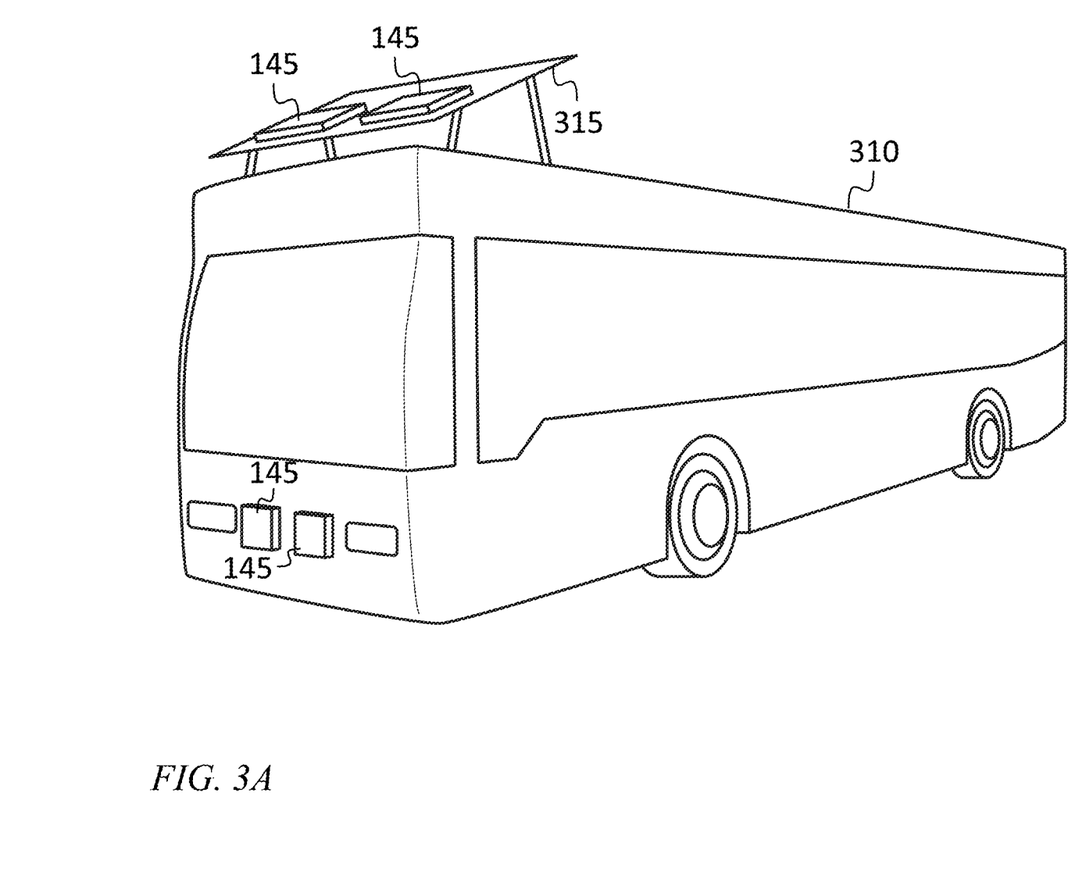
FIG. 3A is a perspective view of a rechargeable vehicle, according to an embodiment of the present invention.
Figure 3B:
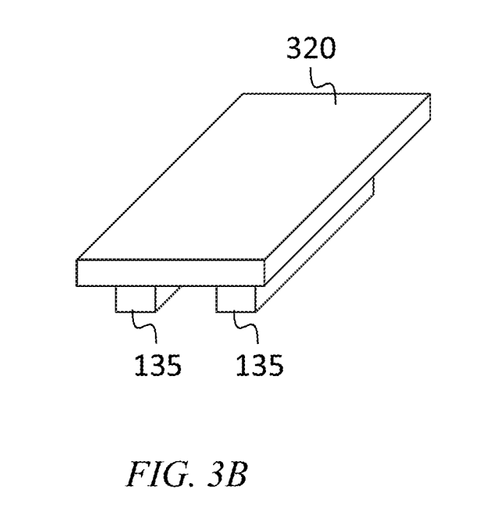
FIG. 3B is a perspective view of a landing surface for a rechargeable vehicle, according to an embodiment of the present invention.
Figure 3C:
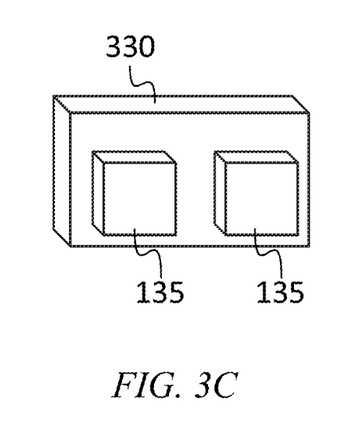
FIG. 3C is a perspective view of a landing surface for a rechargeable vehicle, according to an embodiment of the present invention.

Referring to FIG. 3A, in some embodiments the rechargeable device 140 is a wheeled rechargeable vehicle such as a bus 310 or an automobile. A bus, for example, may have a plurality of contacts 145 secured to an angled support plate 315 secured to the top of the bus 310. The bus 310 may land against an overhead landing surface 320 (FIG. 3B) to cause the contacts 145 on the angled support plate 315 to make contact with corresponding conductive patches 135 on the landing surface. One or both of the angled support plate 315 and the landing surface 320 may be secured by a flexible or compliant mount, making it possible, without requiring precise positioning of the bus 310, to establish contact pressure, between the contacts 145 and the conductive patches 135, that is sufficient for reliable electrical contact without damaging the angled support plate 315, the overhead landing surface 320, or the respective support structures. In another embodiment, front-mounted contacts 145 may be secured (e.g., secured with a compliant mount) to the front of the bus, and they may land against a wall-mounted landing surface 330 (FIG. 3C) that may also be secured with a compliant mount.

Figure 4A:
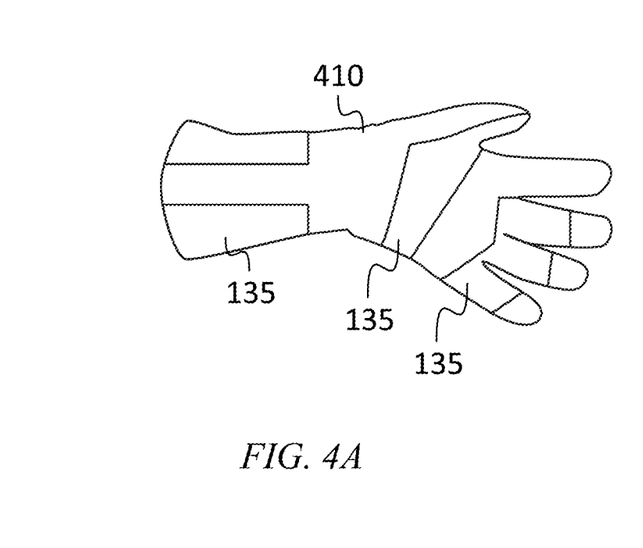
FIG. 4A is a plan view of a landing surface on a glove, according to an embodiment of the present invention.
Figure 4B:
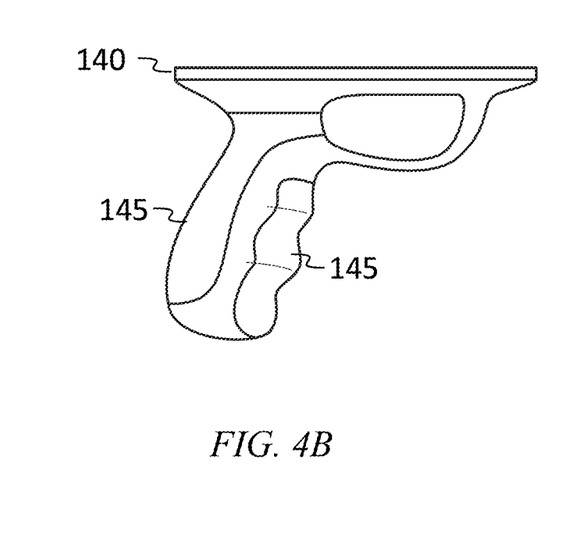
FIG. 4B is a plan view of contacts on a rechargeable device, according to an embodiment of the present invention.

Referring to FIGS. 4A and 4B in some embodiments a glove 410 may include on an exterior surface a plurality of conductive patches 135 so that the exterior surface of the glove 410 may act as a landing surface. The conductive patches 135 may be connected to a charger 105 carried by the wearer of the glove. A hand-held rechargeable device 140, such as a firearm with rechargeable instrumentation, may be equipped with contacts 145 on an exterior surface that is in contact with the glove during normal operation, so that the hand-held rechargeable device 140 may be recharged during operation.

Figure 5A:
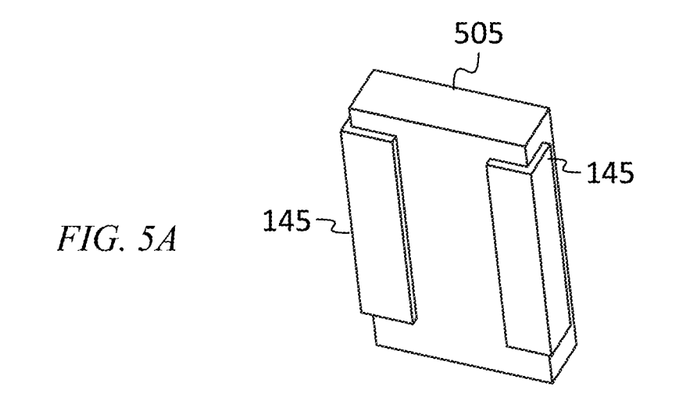
FIG. 5A is a plan view of contacts on a rechargeable device, according to an embodiment of the present invention.
Figure 5B:
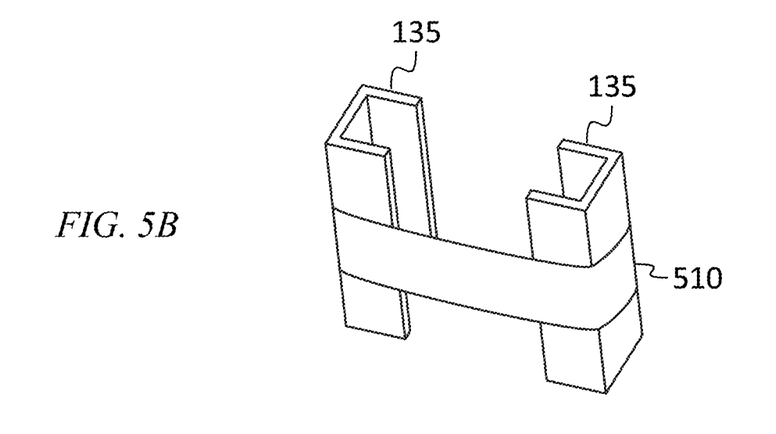
FIG. 5B is a plan view of conductive patches in a holster, according to an embodiment of the present invention.

Referring to FIGS. 5A and 5B in some embodiments a rechargeable device such as a mobile phone 505 may be equipped with contacts 145 on an exterior surface, and a holder, such as a pocket or holster 510, in which the phone may be carried when not in use, may include on an interior surface a plurality of conductive patches 135 so that the interior surface of the holster 510 may act as a landing surface. The mobile phone 505 may then be charged when not in use.

Figure 6A:
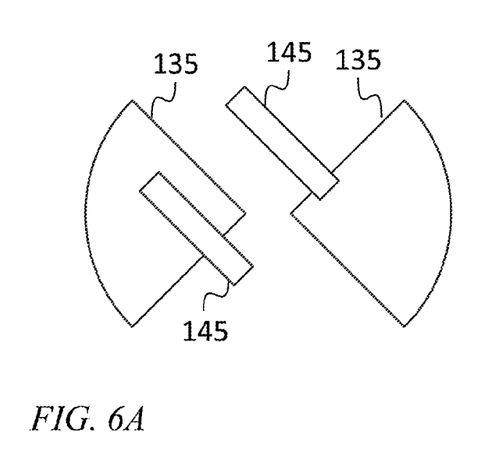
FIG. 6A is a plan view of a landing surface, also showing contacts of a rechargeable device in one position on the landing surface, according to an embodiment of the present invention.
Figure 6B:
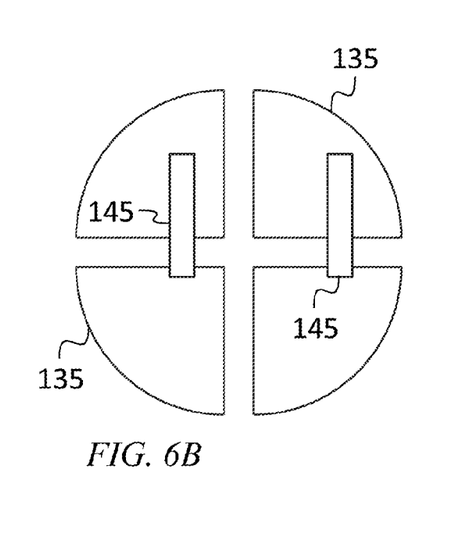
FIG. 6B is a plan view of a landing surface, also showing contacts of a rechargeable device in one position on the landing surface, according to an embodiment of the present invention.
Figure 6C:
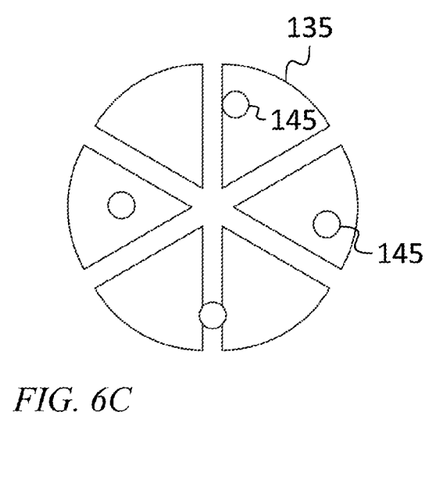
FIG. 6C is a plan view of a landing surface, also showing contacts of a rechargeable device in one position on the landing surface, according to an embodiment of the present invention.

Referring to FIGS. 6A-6C, 7, 8, and 9, various configurations may be used with a flat landing surface 130, for use, for example, with a rechargeable unmanned aerial vehicle. FIGS. 6A-6C show various configurations for the conductive patches 135, with FIG. 6A showing an embodiment with two conductive patches 135, FIG. 6B showing an embodiment with four conductive patches 135, and FIG. 6C showing an embodiment with six conductive patches 135. FIGS. 6A and 6B show how a rechargeable unmanned aerial vehicle with two elongated contacts 145 may establish, through the respective configurations of conductive patches 135 of the two drawings, two separate conductive paths between the charger 105 and the rechargeable unmanned aerial vehicle. FIG. 6C shows how a rechargeable unmanned aerial vehicle with four substantially circular contacts 145 may, through a configuration of six conductive patches 135, establish four separate conductive paths between the charger 105 and the rechargeable unmanned aerial vehicle.

Figure 7:
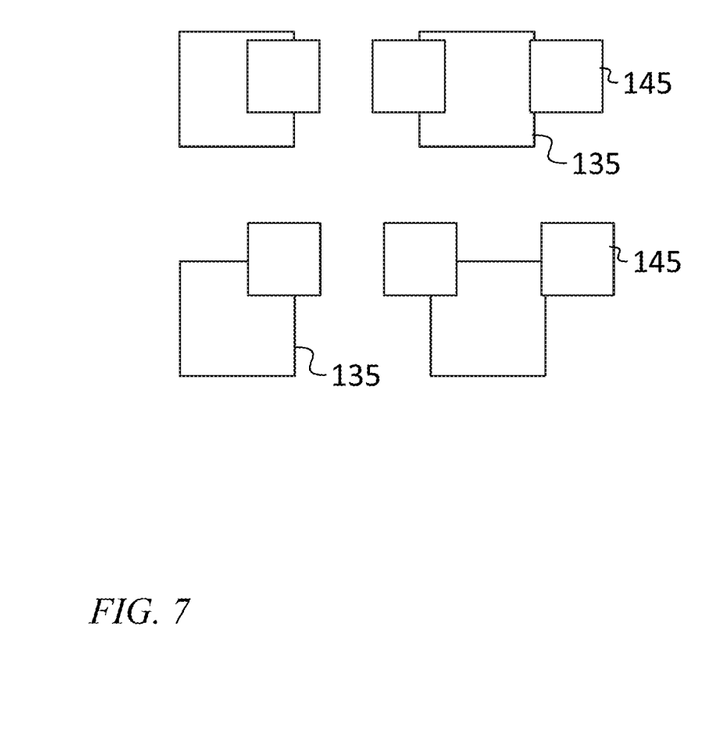
FIG. 7 is a plan view of a landing surface, also showing contacts of a rechargeable device in one position on the landing surface, according to an embodiment of the present invention.

FIG. 7 shows a configuration in which a rechargeable unmanned aerial vehicle with six substantially square contacts 145 may establish four separate conductive paths between the charger 105 and the rechargeable unmanned aerial vehicle, through four substantially square conductive patches 135 on a landing surface.

Figure 8:
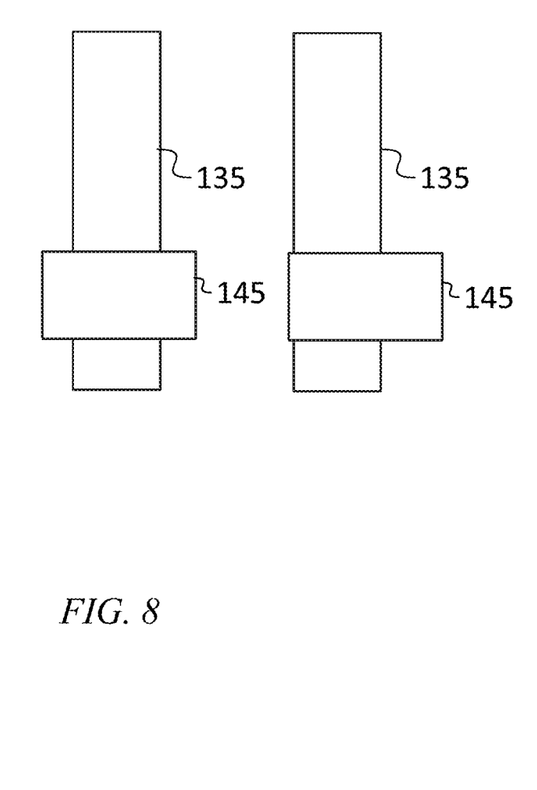
FIG. 8 is a plan view of a landing surface, also showing contacts of a rechargeable device in one position on the landing surface, according to an embodiment of the present invention.

FIG. 8 shows a configuration in which a rechargeable unmanned aerial vehicle with two rectangular contacts 145 may establish two separate conductive paths between the charger 105 and the rechargeable unmanned aerial vehicle, through two rectangular conductive patches 135 on a landing surface.

Figure 9:
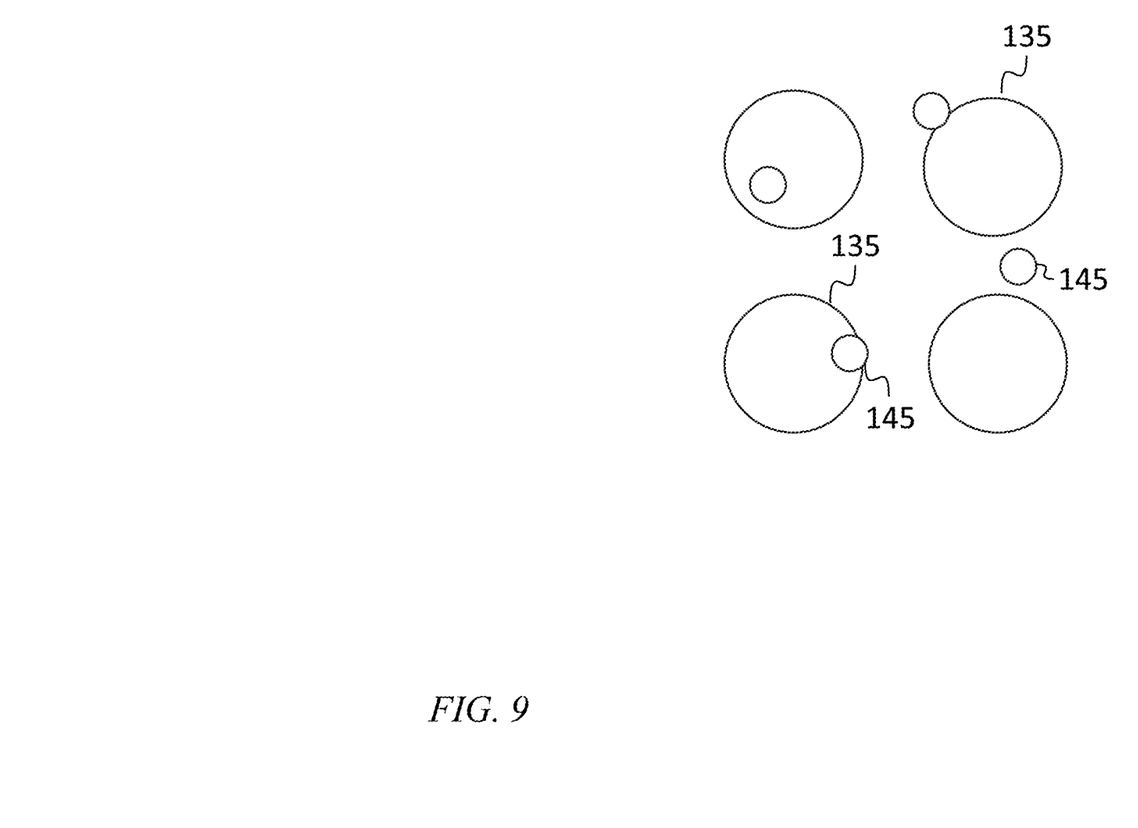
FIG. 9 is a plan view of a landing surface, also showing contacts of a rechargeable device in one position on the landing surface, according to an embodiment of the present invention.

FIG. 9 shows how a rechargeable unmanned aerial vehicle with four substantially circular contacts 145 may establish, through three of four substantially circular conductive patches 135 on a landing surface, three separate conductive paths between the charger 105 and the rechargeable unmanned aerial vehicle.

Although limited embodiments of an automated electrical charger for autonomous platforms have been specifically described and illustrated herein, many modifications and variations will be apparent to those skilled in the art. Accordingly, it is to be understood that an automated electrical charger for autonomous platforms employed according to principles of this invention may be embodied other than as specifically described herein. The invention is also defined in the following claims, and equivalents thereof.

What is claimed is:

1. A system for charging, comprising:
    a rechargeable device having a plurality of electrical contacts, any two contacts of the plurality of contacts being separated by a contact separation distance of a plurality of contact separation distances; and
    a landing surface comprising m conductive patches, m being an integer greater than 1,
    the conductive patches being separated by a plurality of substantially straight gaps extending radially outward from a point on the landing surface,
    one of the conductive patches extending radially outward at least to an inner radius and at most to an outer radius,
    a conductive patch of the m conductive patches having:
        a first edge bounding a first gap of the plurality of substantially straight gaps;
        a second edge bounding a second gap of the plurality of substantially straight gaps,
        a third edge consisting of the remainder of the perimeter of the conductive patch, the length of the third edge being greater than the inner radius times 4/m.

2. The system of claim 1, wherein the landing surface is flat and circular, and the point is at the center of the circle.

3. The system of claim 2, wherein the m conductive patches comprise four conductive patches separated by four gaps of the plurality of substantially straight gaps, each of the four gaps forming an angle of 90 degrees with each of two other gaps of the four gaps.

4. The system of claim 2, wherein the m conductive patches comprise four conductive patches separated by four gaps of the plurality of substantially straight gaps, each of the four gaps forming an angle of more than 100 degrees or less than 80 degrees with each of two other gaps of the four gaps.

5. The system of claim 4, wherein the rechargeable device comprises four contacts arranged in a square, each of the contacts being at one of the corners of the square.

6. The system of claim 1, wherein the landing surface is flat and square, and the point is at the center of the square.

7. The system of claim 1, wherein the rechargeable device is an unmanned aerial vehicle, comprising a plurality of legs, each terminating in a respective foot of a plurality of feet configured to support the unmanned aerial vehicle when not in flight, and wherein each of the plurality of contacts is secured to a respective foot of the plurality of feet.

8. The system of claim 7, wherein the plurality of legs comprises four feet, and wherein the rechargeable device has sufficient compliance that when the rechargeable device rests on the landing surface the weight borne by each foot of the plurality of feet is within 20% of the weight borne by any other foot of the plurality of feet.

9. The system of claim 1, wherein the rechargeable device is an unmanned aerial vehicle, comprising a first skid and a second skid, the first skid and the second skid being configured to support the unmanned aerial vehicle when not in flight, and wherein:
    a first contact of the plurality of contacts is on a lower surface of the first skid, and
    a second contact of the plurality of contacts is on a lower surface of the second skid.

10. The system of claim 9, wherein:
    the first contact is an elongated strip with a length of at least one half a length of the first skid, and
    the second contact is an elongated strip with a length of at least one half a length of the second skid.

11. The system of claim 9, wherein:
    the first skid is configured to contact the landing surface over a first region at a first end of the first skid and over a second region at a second end of the first skid, and to not contact the landing surface over a third region between the first region and the second region,
    the second skid is configured to contact the landing surface over a fourth region at a first end of the second skid and over a fifth region at a second end of the second skid, and to not contact the landing surface over a sixth region between the fourth region and the fifth region,
    the first contact is in the first region,
    the second contact is in the fourth region, and
    the rechargeable device further comprises:
        a third contact is in the second region, and
        a fourth contact is in the fifth region.

12. The system of claim 1, wherein the landing surface has only two conductive patches.

13. The system of claim 12, wherein the two conductive patches are separated by two gaps of the plurality of substantially straight gaps, an angle between the two gaps being greater than 160 degrees.

14. The system of claim 1, wherein each of the contacts has a contact diameter, and wherein each of the plurality of substantially straight gaps is wider than a largest one of the contact diameters.

15. The system of claim 1, wherein the rechargeable device comprises five contacts and the landing surface comprises five conductive patches.

16. The system of claim 15, wherein for any position of the rechargeable device with all five contacts in contact with the landing surface, at least two contacts of the five contacts are in contact with different respective conductive patches of the m conductive patches.

17. The system of claim 16, wherein for any position of the rechargeable device with all five contacts in contact with the landing surface no contact of the plurality of contacts forms a direct connection between a first conductive patch of the m conductive patches and a second conductive patch of the m conductive patches.

18. The system of claim 1, wherein the rechargeable device is a wheeled vehicle, the plurality of contacts includes two contacts on top of the wheeled vehicle, and the landing surface is configured to contact the plurality of contacts from above.

19. The system of claim 1, wherein the rechargeable device is a hand-held device and the landing surface is a surface of a glove.

20. The system of claim 1, wherein the rechargeable device is a mobile phone and the landing surface is an interior surface of a pocket or of a holster.

\* \* \* \* \*